United States Patent Office 3,483,073
Patented Dec. 9, 1969

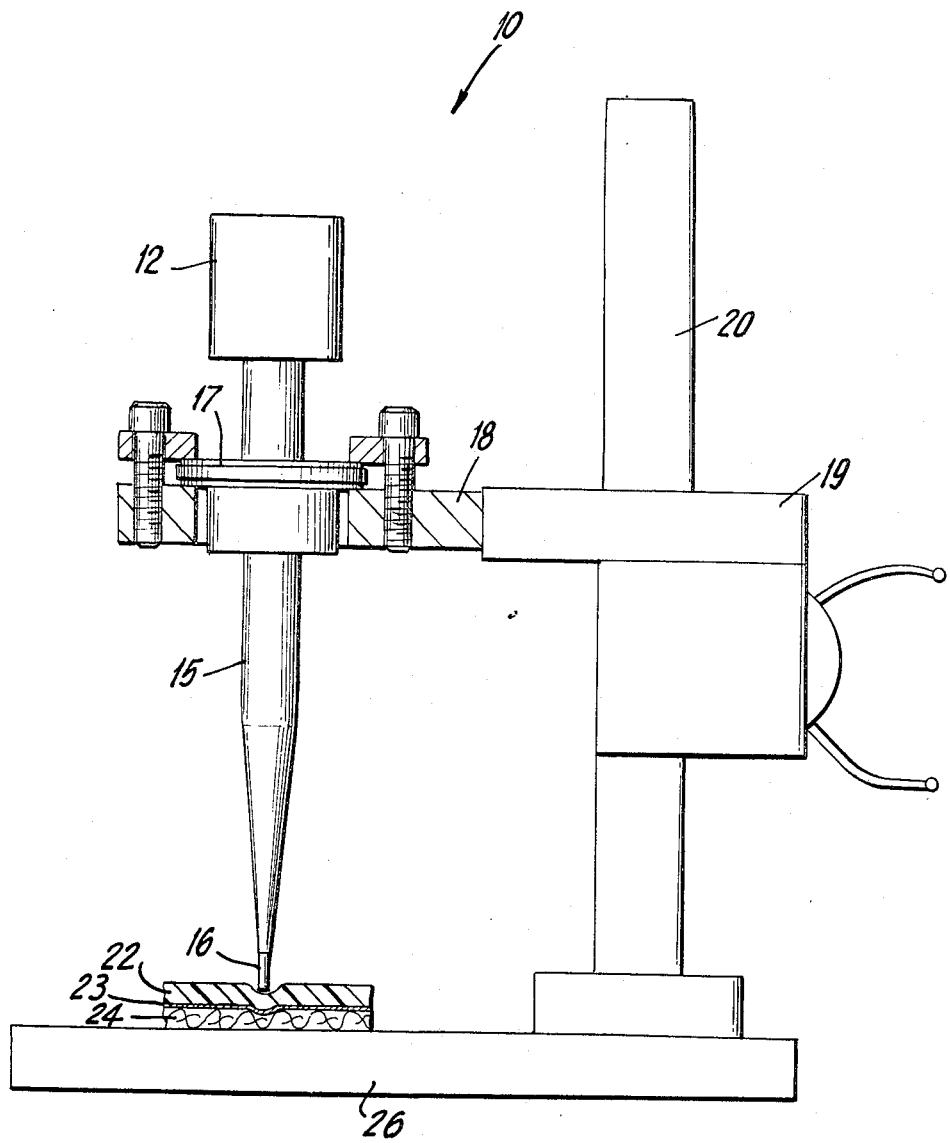

3,483,073
JOINED SHEETS OF CROSS-LINKED POLY-
URETHANE AND METHOD OF JOINING
Donald Whitworth Pounder, Birmingham, and Roy Axe,
Sutton Coldfield, England, assignors to Dunlop Rubber
Company Limited, London, England, a British
company
Filed July 6, 1966, Ser. No. 563,076
Claims priority, application Great Britain, July 24, 1965,
31,672/65
Int. Cl. B32b 27/40, 31/16; B29c 27/08
U.S. Cl. 161—190                                    11 Claims

ABSTRACT OF THE DISCLOSURE

A method of joining two sheets of fully cross-linked polyurethane composition by the application of ultrasonic oscillations at the location of desired joining.

---

This invention relates to a method of joining sheets of a fully cross-linked polyurethane composition and to the products of such a method.

According to the present invention, a method of joining at least two sheets of a fully cross-linked polyurethane composition comprises assembling the sheets in contact with each other at the position of the desired joint and applying ultrasonic oscillations to the assembly at the position of the desired joint.

According to the present invention also, there is provided two or more joined sheets of a fully cross-linked polyurethane composition when joined by the method described in the immediately-preceding paragraph.

The sheets which can be joined by the method of this invention include planar and shaped sheets. For example, a shaped, e.g. dished or cylindrical, sheet can be joined to a similar sheet or to a planar sheet depending on the product desired. The sheets may be in the form of unreinforced polyurethane film or in the form of textile fabric coated with a fully cross-linked polyurethane composition.

The polyurethane composition referred to may be non-cellular or cellular (polyurethane foam) and may be prepared in the known way by a one-step process in which an organic compound having more than one active-hydrogen atom, e.g. a polyol or polyamine, is reacted with an organic compound having more than one isocyanate or isothiocyanate group, the functionality of the reactants being such as to produce a cross-linked polyurethane; or by a two-step process in which an organic compound having two active-hydrogen atoms, e.g. a diol, is reacted with an organic compound having two isocyanate or isothiocyanate groups, e.g. toluylene diisocyanate or hexamethylene diisocyanate, one of the reactants being in stoichiometric excess to form a substantially non-cross-linked usually liquid polyurethane prepolymer having two substantially terminal active-hydrogen atoms or isocyanate or isothiocyanate groups per molecule, and then cross-linking the prepolymer by reacting it with a cross-linking agent such as a trifunctional organic compound, e.g. a triol, a triamine, a triisocyanate, water or methylene-bis-orthochloraniline. A solvent for one or more of the reactants, a catalyst such as dibutyl tin dilaurate or stannous octoate and a foaming agent may also be present during the formation of the polyurethane where desired. When a polyol is used in the preparation of the polyurethane, it may be, for example, a polyether polyol, a polythioether polyol, a polyester polyol, a polyesteramide polyol or a polyamide polyol. Typical polyurethane prepolymers are those prepared from a polyglycol such as poly-1,4-tetramethylene glycol or polypropylene glycol, and such prepolymers produce cross-linked polyurethanes which are particularly resistant to hydrolysis by water.

Alternatively, the cross-linked polyurethane composition may be prepared by vulcanizing a polyurethane rubber composition. Such rubbers are usually fabricated on conventional mills or calenders and they may be vulcanized by reaction with polyisocyanates, peroxides or sulphur.

A textile fabric having a coating of a fully cross-linked polyurethane composition may be obtained from any natural or synthetic fibres; for example, the fabric may be obtained by weaving yarns of the desired count or denier, or by forming textile fibres into a felt in which the fibres are arranged at random. Alternatively, a cord fabric containing little or no weft may be used, or two or more crossed plies of such a cord fabric can be employed. Typical fibrous textile materials which may be used are cotton, linen, polyamides such as nylon, regenerated cellulose, and poly(ethyleneglycol terephthalate). Other materials which can be obtained in the form of fibres or filaments, such as natural or synthetic rubber, may also be used.

When a polyurethane prepolymer is applied to one or both surfaces of a textile fabric and caused to become cross-linked, a solid but flexible coating is obtained. Before the prepolymer is applied to the surface to be coated it can be mixed with a cross-linking agent to convert the coating on the textile fabric material into a solid polyurethane. Alternatively, no cross-linking agent need be added to the said prepolymer, and the textile fabric coated with the prepolymer can be maintained in a moist atmosphere until the conversion to a solid polyurethane is completed. The polyurethane prepolymer may be dissolved in an organic solvent such as butyl acetate before it is applied to the fabric. Inert fillers, such as carbon black, and pigment may be mixed with the said prepolymer. By "inert" fillers is meant fillers which do not cause the prepolymer to set prior to its application to the fabric.

As stated hereinbefore, the sheets of a fully cross-linked polyurethane composition are joined by assembling them in contact with each other, i.e. in overlapping or abutting relationship, at the position of the desired joint and applying ultrasonic oscillations to the assembly at this position. Preferably, the thickness of the assembly of sheets at the position of the desired joint when the oscillations are applied is less than the normal thickness of the assembly and more preferably the thickness of the assembly at the position of the desired joint during application of the oscillations is about half the normal thickness of the assembly. The ultrasonic oscillations may be supplied by any suitable known ultrasonic welding machine and such a welding machine usually comprises a source of ultrasonic oscillations connected to a welding tip, means for altering the amplitude of the oscillations of the welding tip, an anvil positioned directly facing the welding tip, said anvil acting as a support for the sheets of a fully cross-linked polyurethane composition when a joint between the sheets is being produced, and means for adjusting the distance between the welding tip and the anvil. The oscillations of the welding tip are usually supplied by a magnetostrictive or piezoelectric transducer. The amplitude of the oscillations of the welding tip depends on the wattage power supplied. The welding tip and the anvil may have various shapes such as rods, laths, rings, discs, sheets or combinations of these shapes. In producing a line joint between two or more sheets of a fully cross-linked polyurethane by the method of this invention, both the welding tip and the anvil may be in the form of aligned metal laths or the welding tip may be in the form of a metal lath and the anvil may be in the form of a flat sheet or disc.

To produce a joint between two or more sheets, the sheets are assembled in contact with each other, i.e. in overlapping or abutting relationship, at the position of the desired joint, the welding tip is placed in contact with one exposed surface of the assembly and the anvil is placed in contact with the diametrically opposite exposed surface of the assembly, at the position of the desired joint, and preferably the distance between the welding tip and the anvil is reduced until the thickness of the assembly at the position of the joint is less than the normal thickness of the assembly whilst ultrasonic oscillations are supplied to the welding tip until a joint between the sheets is formed. Preferably, during the passage of the ultrasonic oscillations, the distance between the welding tip and the anvil is decreased until the thickness of the assembly at the position of the desired joint is decreased by about half. In some instances, a stronger joint may be obtained by maintaining pressure at the position of the joint for a short time after the oscillations have been stopped.

When the sheets are assembled in "abutting relationship," it is mean that the edges of the sheets are in contact with each other but do not overlap each other. When an abutting joint is made in the construction of a vessel intended to contain a fluid, then it is usual to cover the joint by welding one or more strips of similar material over the joint in order to obtain improved fluid imperviousness and greater strength.

The frequency and amplitude of the oscillations of the welding tip and the time of treatment should be such that a joint of optimum strength is obtained. For a fixed frequency the time of treatment required to produce a strong joint decreases as the amplitude is increased. The frequency of the oscillations is usually from 10 to 100 kilocycles per second and is preferably about 20 kilocycles per second. Generally, the joint does not attain its full strength until it has stood for at least one day after being produced.

The method of this invention is particularly useful in the manufacture of flexible containers, e.g. fuel containers. Hitherto, it was known to manufacture fuel containers from fabrics coated with a cross-linked polyurethane composition but difficulty was experienced in joining two cross-linked polyurethane surfaces by employing an adhesive composition, and further, adhesive-formed joints do not show maximum stability when in contact with water and liquid hydrocarbons at high temperatures, e.g. 40° C. to 100° C., for long periods of time. By making a fuel container having walls comprising polyurethane sheets, said sheets comprising fabric coated with a cross-linked polyurethane composition and being joined by the method of this invention, there is provided a strong, light, flexible container having strong joints which are as water- and hydrocarbon-resistant as the polyurethane sheet itself.

Such containers may be static containers such as fuel tanks for vehicles and aircraft, or movable containers such as flexible barges. Barges having walls of a textile fabric coated with a cross-linked polyurethane composition, said walls being joined by an ultrasonic welding operation, are particularly advantageous since they show no tendency to tear when subjected to external forces, they exhibit excellent water- and hydrocarbon-resistances, and they are easy to manufacture. Such barges may be used for the oversea transport of liquid hydrocarbons, e.g. oil, petrol, paraffin, aviation spirit and other liquids having a density below that of seawater. Sea-going barges may have a width of up to 20 feet and a length of up to 600 feet. Preferably, the barges have a shape resembling a closed cylinder with one or both ends tapered.

Sheets of a fully cross-linked polyurethane composition joined by the method of this invention have many other desirable uses also, for instance, in the construction of flexible basins, inflatable articles, dinghies or pneumatic mattresses, or as protective cloths.

Although it is known to join sheets of thermoplastic compositions by the method of ultrasonic welding, this method has generally proved unsatisfactory in joining sheets of a fully cross-linked thermosetting composition. Thus, this invention is surprising in that sheets of a fully cross-linked thermosetting polyurethane composition are successfully joined by the method of ultrasonic welding.

Description of the preferred embodiments:

Referring now to the attached drawing comprising a single figure, there is shown a typical ultrasonic welding machine 10 for carrying out the process of the invention. The welding machine comprises means for producing ultrasonic vibrations by transducer 12, such as a magnetostrictive or piezoelectric transducer, suitably attached to a tapered welding tip holder 15 which in turn carries a welding tip 16. The holder 15 is provided with a support ring 17 secured by an annular clamping means 18 extending from height adjustment support 19 of stand 20.

The sheet 22 is a sheet of a fully cross-linked polyurethane composition. The sheet 24 is a sheet consisting of a textile fabric sheet having a coating 23 of a fully cross-linked polyurethane composition. The two sheets are placed in juxtaposition as shown on the surface of the anvil 26.

The tip 16 is oriented over the position of the desired joint of the two sheets. The spacing of the end of the tip 16 with respect to the surface of the anvil 26 is preferably reduced until the thickness of the assembly at the bent position of the joint is less than the normal thickness of the assembly while the ultrasonic oscillations are supplied to the welding tip until a joint between the sheets is formed.

The invention is illustrated in the following examples:

Example I

This example shows the production of a joint between two unreinforced non-cellular fully cross-linked polyurethane sheets.

The ultrasonic welding machine used in this example comprised a 1 kilowatt valve oscillator coupled to a 20 kilocycles per second magnetostrictive transducer fitted with a tool which tapered to a welding tip having a domed working face of 8 mm. diameter. Two 0.4 mm. thick sheets of a fully cross-linked polyurethane rubber were made by a solution casting technique from a mixture of Adiprene L–100 (a commercially-available polyether polyurethane prepolymer having terminal isocyanate groups) and 0.8 mole equivalent of methylene-bis-orthochloraniline, the sheets being cured at 100° C. for 3 hours. The sheets were assembled in overlapping relationship on the flat anvil of the ultrasonic welding machine and the welding tip was pressed against the upper exposed surface of the assembly for 2 to 3 seconds during which time the welding tip was oscillated at a frequency of 20 kilocycles per second. The resulting joint was strong and increased in strength on standing.

Example II

This example shows the production of a joint between two sheets of nylon fabric coated with a non-cellular fully cross-linked polyurethane composition.

The ultrasonic welding machine used in this example was made by Herfurth G.m.b.H. and had a power rating of 600 watts and a frequency of 24 kilocycles per second. The welding tip and the anvil were each 3 mm. wide and 45 mm. long. A woven nylon fabric sheet was proofed by coating it on each side with 14 ounces per square yard of a mixture of Formrez P–211 (a commercially-available polyester polyurethane prepolymer having active isocyanate groups) and 0.9 mole equivalent of methylene-bis-orthochloraniline, and curing the coating at 100° C. for 3 hours. The proofed sheet was assembled in overlapping relationship with a similarly proofed sheet between the welding tip and the anvil of the welding machine, and the welding tip was pressed onto the assembly. The welding tip was oscillated for 1½ seconds and after a further 1 second the assembly was removed from the machine. After storing for 1 week, the joint showed a tear-down strength of 46 pounds per linear inch.

Example III

This example shows the production of a joint between two sheets of unreinforced fully cross-linked polyurethane foam.

The ultrasonic welding machine used in the example was a "Soniprobe" Model 1130A made by Dawe Instrument Company and was operated by a 250-watt oscillator feeding a lead zirconate ceramic transducer which was capable of oscillating a welding tip at a frequency of about 20 kilocycles per second. The welding tip was dome-shaped and of 10 mm. diameter. The machine was fitted to a stand by a clamp capable of being raised and lowered. Two ¼ inch thick sheets of polyether polyurethane foam of density 2 pounds per cubic foot were assembled in overlapping relationship on the base-plate of the stand and the welding tip was lowered onto the upper surface of the assembly. The welding tip was oscillated for 10 seconds after which time a satisfactory joint had been produced between the sheets.

Example IV

This example shows the production of a joint between three sheets of unreinforced fully cross-linked polyurethane foam.

The ultrasonic welding machine used in this example was the same as that used in Example III. Three ⅛ inch thick sheets of polyether foam of density 2 pounds per cubic foot were assembled in overlapping relationship between the welding tip and the base-plate of the stand and the welding tip was pressed onto the upper surface of the assembly. The welding tip was oscillated for 30 seconds after which time all three sheets were found to be firmly joined.

Example V

This example shows the production of a joint between two sheets of nylon fabric coated with a non-cellular fully cross-linked polyurethane rubber.

The machine used in this example was the same as that used in Example III. Two woven nylon fabric sheets were coated on both sides with a compounded mixture of Bayer Commercial Trial Product KA 5056 (a commercially-available polyurethane rubber), a toluylene diisocyanate dimer and carbon black, and the coatings were press-cured for 10 minutes at 135° C. followed by stoving for 24 hours at 100° C. The thickness of each proofed fabric sheet was then 2.0 mm. A joint between the sheets was produced as described in Example III except that the welding tip was oscillated for 25 seconds. The joint was strong and increased in strength on standing.

Having now described our invention, what we claim is:

1. A method of joining at least two sheets of a fully cross-linked polyurethane composition comprising assembling the sheets in contact with each other at the position of the desired joint and applying ultrasonic oscillations to the assembly at the position of the desired joint.

2. A method according to claim 1 in which the sheets are assembled in contact with each other at the position of the desired joint between the welding tip and the anvil of an ultrasonic welding machine, the welding tip being in contact with one exposed surface of the assembly and the anvil being in contact with the diametrically opposite exposed surface of the assembly, and supplying ultrasonic oscillations to the welding tip until a joint between the sheets is formed.

3. A method according to claim 1 in which the thickness of the assembly at the position of the desired joint when the oscillations are applied is less than the normal thickness of the assembly.

4. A method according to claim 3 in which the thickness of the assembly at the position of the desired joint when the oscillations are applied is half the normal thickness of the assembly.

5. A method according to claim 1 in which pressure is applied to the assembly at the position of the desired joint during application of the oscillations and for a short time after the oscillations have been stopped.

6. A method according to claim 1 in which the frequency of the oscillations is from 10 to 100 kilocycles per second.

7. A method according to claim 6 in which the frequency of the oscillations is 20 kilocycles per second.

8. A method according to claim 1 in which at least one of the sheets is in the form of an unreinforced film of a fully cross-linked polyurethane composition.

9. A method according to claim 1 in which at least one of the sheets is in the form of a textile fabric sheet having a coating of a fully cross-linked polyurethane composition.

10. A method according to claim 9 in which the textile fabric comprises a nylon.

11. At least two joined sheets of a fully cross-linked polyurethane composition when joined by the method according to claim 1.

References Cited

UNITED STATES PATENTS

| | | | |
|---|---|---|---|
| 3,038,187 | 6/1962 | Nathanson | 161—190 XR |
| 3,242,029 | 3/1966 | Deans | 156—73 XR |
| 3,129,014 | 4/1964 | Hutchison et al. | 150—.5 |

PHILIP DIER, Primary Examiner

U.S. Cl. X.R.

156—73, 304, 306; 229—3.5